(12) United States Patent
Parker

(10) Patent No.: US 9,354,661 B2
(45) Date of Patent: May 31, 2016

(54) CONTOURED EDGE CONTROLS FOR HAND HELD DEVICES

(71) Applicant: Lenovo (Singapore) Pte. Ltd., Singapore (SG)

(72) Inventor: Joseph Robert Parker, Hillsborough, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 108 days.

(21) Appl. No.: 14/178,430

(22) Filed: Feb. 12, 2014

(65) Prior Publication Data

US 2015/0227169 A1 Aug. 13, 2015

(51) Int. Cl.
*G06F 1/16* (2006.01)

(52) U.S. Cl.
CPC ......... *G06F 1/1633* (2013.01); *Y10T 29/49002* (2015.01)

(58) Field of Classification Search
CPC ....................................................... G06F 1/16
See application file for complete search history.

(56) References Cited

U.S. PATENT DOCUMENTS

| | | | | |
|---|---|---|---|---|
| 7,206,198 B2* | 4/2007 | Wang | ...................... | 361/679.55 |
| 7,502,222 B2* | 3/2009 | Cheng et al. | ............. | 361/679.06 |
| 8,289,688 B2* | 10/2012 | Behar et al. | ................ | 361/679.3 |
| 8,295,039 B2* | 10/2012 | Cheng et al. | ............. | 361/679.26 |
| 8,405,978 B2* | 3/2013 | Okutsu | ..................... | 361/679.55 |
| 8,824,134 B2* | 9/2014 | Chu et al. | .................... | 361/679.4 |
| 2008/0068786 A1* | 3/2008 | Cheng et al. | .................. | 361/683 |
| 2009/0237878 A1* | 9/2009 | Chen | ........................ | 361/679.55 |
| 2009/0303676 A1* | 12/2009 | Behar et al. | ............. | 361/679.27 |
| 2014/0362512 A1* | 12/2014 | Hinson | .................... | 361/679.21 |

* cited by examiner

*Primary Examiner* — Lisa Lea Edmonds
(74) *Attorney, Agent, or Firm* — Ference & Associates LLC

(57) ABSTRACT

An embodiment provides an apparatus, including: a housing; a processor operatively coupled to a memory; and a display device displaying output from the processor; the display, the processor and the memory being disposed in the housing; said housing substantially forming a quadrilateral and including a shaped edge at one end thereof; said housing further comprising a contoured input device substantially matching the shaped edge. Other aspects are described and claimed.

17 Claims, 4 Drawing Sheets

CONTOURED EDGE CONTROLS FOR HAND HELD DEVICES

BACKGROUND

An information handling device ("device", "apparatus"), for example a tablet computing device, a hybrid laptop/tablet device, a smart phone, an e-reader, etc., may be formed with hand-held use in mind. Certain devices implement a contoured edge that makes holding the device in one hand easier. For example, the LENOVO YOGA tablet computing device includes a cylindrical edge at one end of the housing facilitating hand-held use. YOGA is a registered trademark of Lenovo (Beijing) Limited Corporation in the United States and other countries.

BRIEF SUMMARY

In summary, one aspect provides an apparatus, comprising: a housing; a processor operatively coupled to a memory; and a display device displaying output from the processor; the display, the processor and the memory being disposed in the housing; said housing substantially forming a quadrilateral and including a shaped edge at one end thereof; said housing further comprising a contoured input device substantially matching the shaped edge.

Another aspect provides an apparatus, comprising: a housing; a processor operatively coupled to a memory; a display device displaying output from the processor; the display, the processor and the memory being disposed in the housing; and a stand element attached to the housing; said housing substantially forming a quadrilateral and including a shaped edge at one end thereof; said housing further comprising a contoured input device substantially matching the shaped edge.

A further aspect provides a method, comprising: forming a substantially quadrilateral housing having disposed therein a processor operatively coupled to a memory; providing a display device in said housing, said display device being operatively coupled to the processor; said housing including a shaped edge at one end thereof; and incorporating a contoured input device with said shaped edge, said contoured input device substantially matching the shaped edge.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While certain devices incorporate a contoured or shaped edge, e.g., a cylindrical edge included with a tablet computing device, when using the camera or other peripheral device with such a form factor, it is necessary to tap an existing control, e.g., a soft control on the touch screen, to take a picture (or perform another function associated with another peripheral device). As may be appreciated, this is often cumbersome, especially in a single-handed use scenario.

An embodiment thus provides one or more input devices, e.g., a contoured button that is/are embedded into the shaped or contoured edge. This permits a user to simply provide a tap (e.g., using a thumb on the hand holding the device) to operate a function of the device, e.g., to take a picture using the camera. It should be noted that integration of the contoured control with the camera is just an example function for such a contoured input device. Thus, another contoured input device, e.g., a button or touch sensitive surface, optical input device, etc., may also be used (in addition to or in lieu of a button or like input control) for various other functions, e.g., depending on the state or configuration of the device, and/or application(s) running or active on the device, etc.

The illustrated example embodiments will be best understood by reference to the figures. The following description is intended only by way of example, and simply illustrates certain example embodiments.

Figure 1:
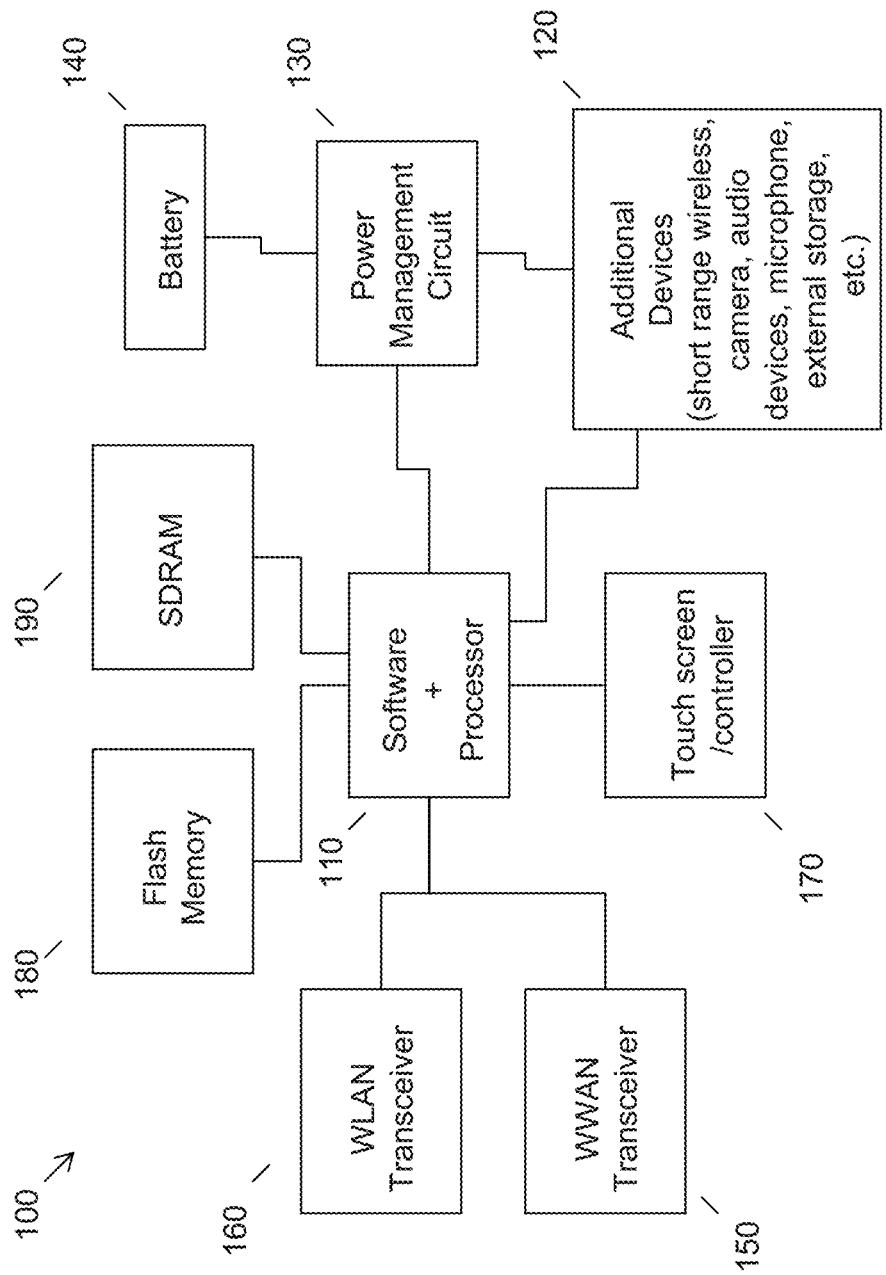
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip or circuit design found for example in tablet or other mobile computing platforms. Software and processor(s) are combined in a single chip or circuit 110. Processors comprise internal arithmetic units, registers, cache memory, busses, I/O ports, etc., as is well known in the art. Internal busses and the like depend on different vendors, but essentially all the peripheral devices (120) may attach to a single chip or circuit 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) or circuit(s) 130, e.g., a battery management unit, BMU, which manage power as supplied, for example, via a rechargeable battery 140, which may be recharged by a connection to a power source (not shown). In at least one design, a single chip or circuit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 may be included, for example a camera. Commonly, system 100 will include a touch screen 170 for data input and display/rendering. System 100 also typically includes various memory devices, for example flash memory 180 and SDRAM 190.

Figure 2:
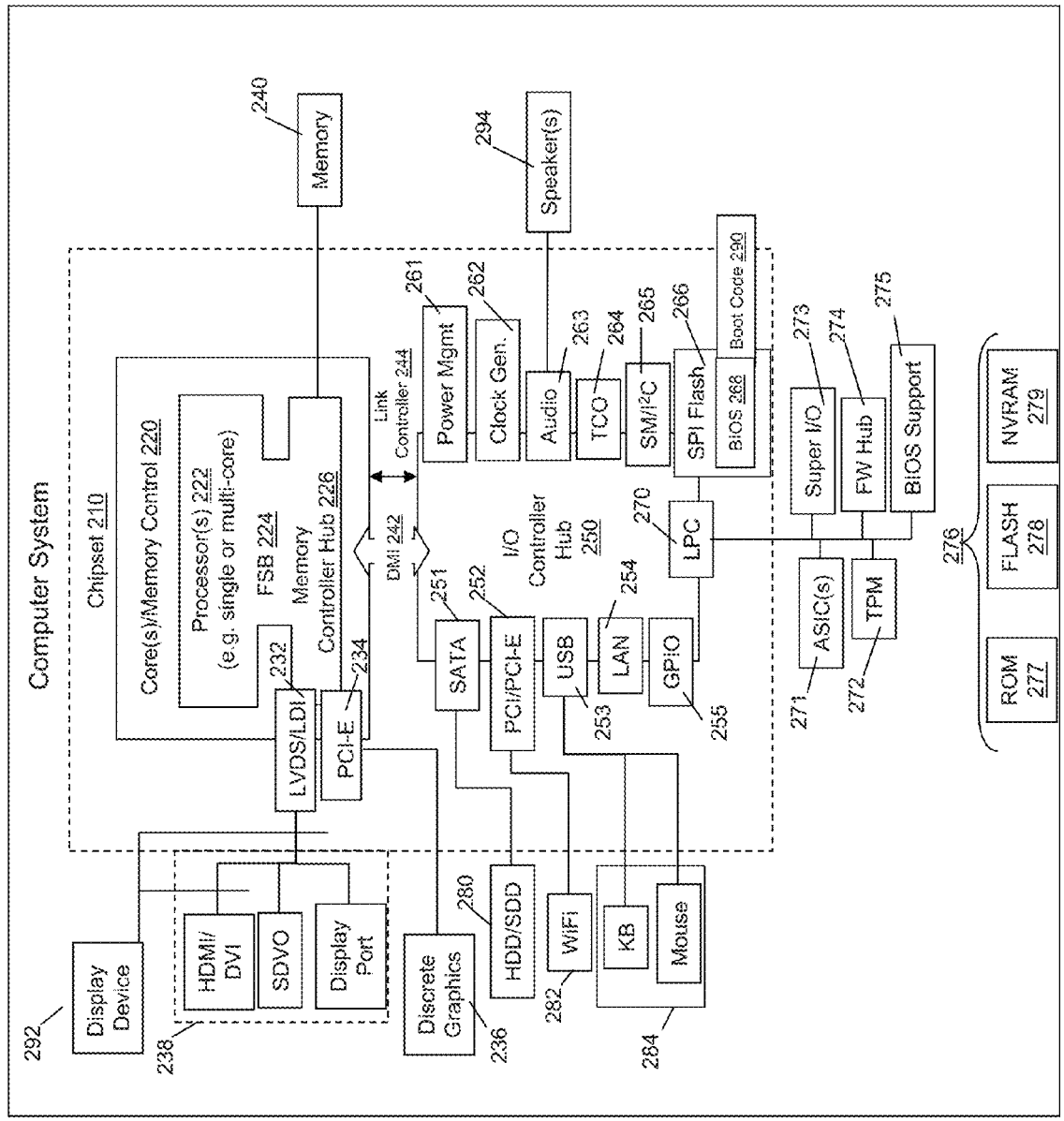
FIG. 2 illustrates another example of an information handling device.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that provide a contoured edge. For example, referring to FIG. 3, an example tablet computing device 300 is illustrated.

Figure 3:
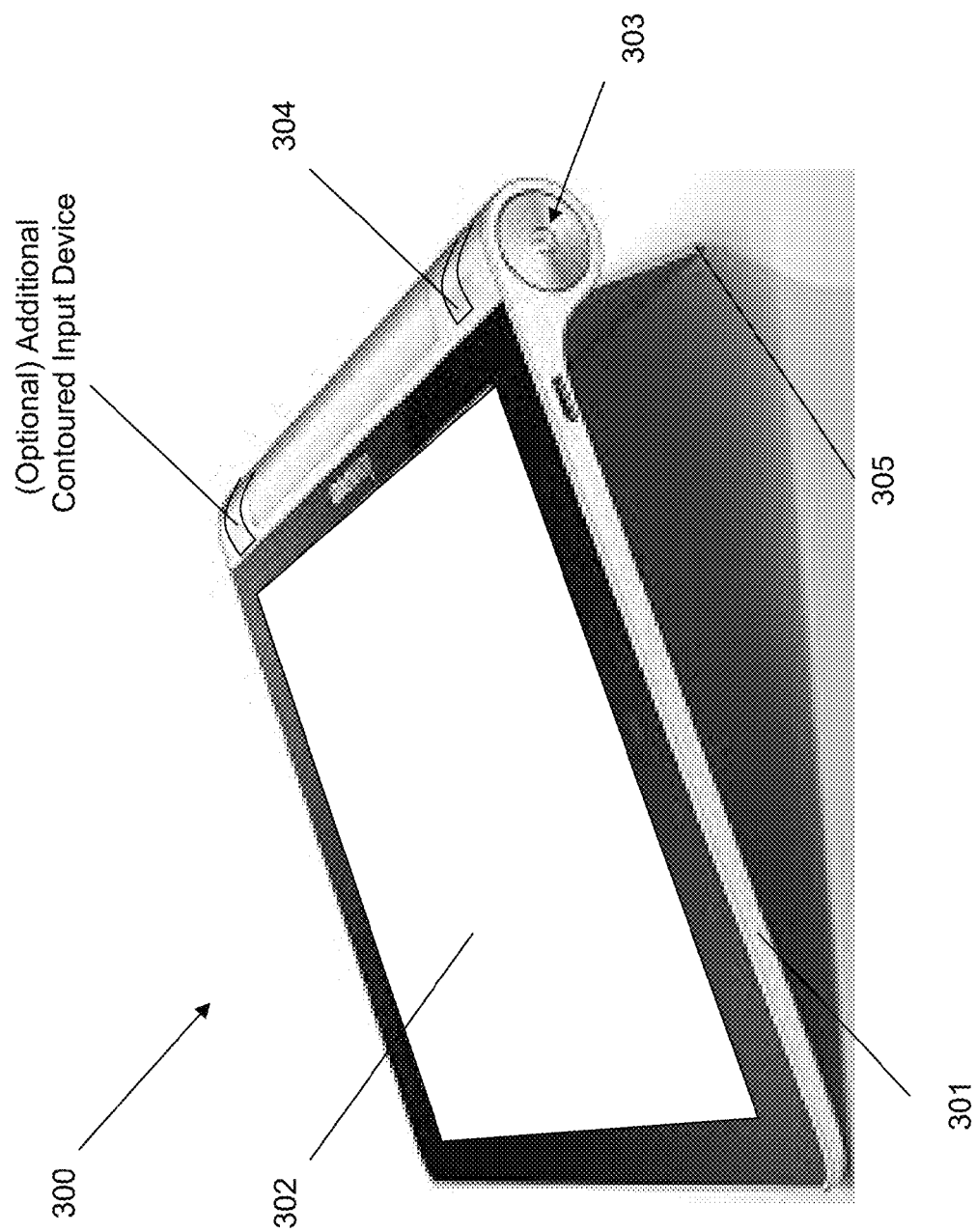
FIG. 3 illustrates an example view of a device including a contoured edge control.

The device 300 includes a main housing 301 that includes, e.g., a touch screen display 302. As illustrated in the example of FIG. 3, the device 300 may have a housing that is substantially quadrilateral (e.g., rectangular) but also includes a contoured or shaped edge 303, here in the form of a substantially cylindrical shaped edge 303. The device 300 may include, according to an embodiment, one or a plurality of contoured input devices, e.g., contoured input device 304, incorporated into the contoured edge 303.

The example of FIG. 3 includes a contoured input device 304, e.g., a ring shaped button or other device. The contoured input device 304 may accept touch based input and be formed to coordinate with the shape (here, a contoured edge 303 that is cylindrical in form) of the edge, which allows the contoured input device 304 to be embedded in the contoured edge 303 of such a device 300.

In the example of FIG. 3, it will be noted that the button 304 surface is curved or takes on a ring shape in order to match the cylinder of the contoured edge 303. This configuration allows the button 304 to be placed in the contoured edge 303 such that it does not disrupt the aesthetic quality of the contoured edge, does not interrupt the hinged nature of the contoured edge, and additionally allows the button 304 to be pressed from various angles of approach.

Functionally, the button 304 may be implemented in a variety of forms, e.g., as a mechanical or a capacitive touch switch. A mechanical form may rely on a central axis point which is moved whenever the button 304 is pressed from any angle to activate the switch. Other configuration may be acceptable or preferable, e.g., depending on the shape of the contoured edge 303, the functionality associated with the contoured input device 304, etc.

Figure 4:
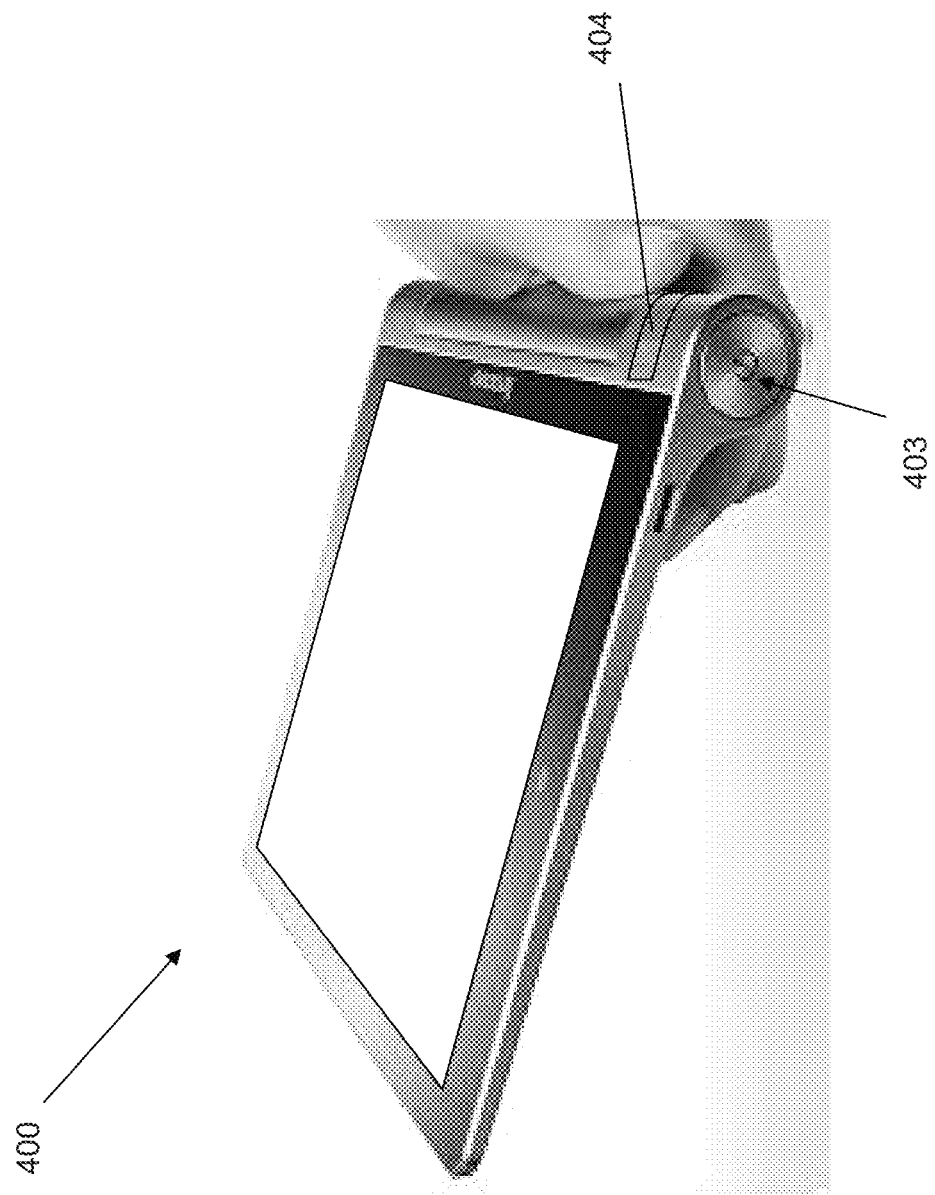
FIG. 4 illustrates another example view of a device including a contoured edge control.

Referring to FIG. 4, a device 400 may include the contoured input device 404 in a location such that it is readily accessible during single handed use, as illustrated. For example, a contoured input device 404 may be located proximate to one of the ends of the contoured edge 403 such that it is readily tapped, e.g., using a thumb. More than one contoured input device 404 may be included in the contoured edge, e.g., to accommodate left and right handed use. For example, two contoured input devices 404 (only one being illustrated) may be included, such as incorporating a contoured input device 404 at opposite ends of the contoured edge 403.

Alternatively, or in addition to inclusion of more than one contoured input device 304, an embodiment may alter the functionality of the contoured input device(s) 404, e.g., based on a holding orientation (e.g., as sensed via positional sensors such as an accelerometer, gyroscope, and compass), a currently running or active application, etc. For example, a contoured input device 404 may have its functionality changed, altered, removed, or adjusted depending on which hand is being used to hold the device, e.g., as determined via mapping sensed positional inputs to a predetermined pattern of device use (e.g., left handed, right handed) and/or via use selection.

Similarly, a particular application being used, e.g., camera application, may change or adjust the functionality of the contoured input device 404, e.g., to map input received via the contoured input device 404 to an underlying application control action, e.g., taking a picture with a camera application responsive to detecting input via the contoured input device 404. Likewise, one or more of the contoured input devices 404 may be deactivated or activated based on a variety of parameters, e.g., holding orientation, running application(s), or even the physical configuration of the device, e.g., position of a stand element 305 (referring back to FIG. 3) with respect to the housing 301. Thus, an embodiment may alter or adjust the contoured input device 404 functionality based on a variety of parameters.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An apparatus, comprising:
 a housing;
 a processor operatively coupled to a memory; and
 a display device displaying output from the processor;
 the display, the processor and the memory being disposed in the housing;
 said housing substantially forming a quadrilateral and including a shaped edge at one end thereof;
 said housing further comprising a contoured touch sensitive input surface substantially matching the shaped edge, wherein the contoured touch sensitive input surface is selected from the group consisting of an optical input surface and a capacitive input surface.

2. The apparatus of claim 1, wherein the shaped edge is substantially cylindrical, and further wherein said contoured touch sensitive input surface is substantially cylindrical.

3. The apparatus of claim 2, wherein the contoured touch sensitive input surface wraps substantially around the shaped edge.

4. The apparatus of claim 3, wherein the contoured touch sensitive input surface is substantially ring shaped.

5. The apparatus of claim 1, wherein the processor executes code to change a function associated with the contoured touch sensitive input surface according to an application currently being executed by the processor.

6. The apparatus of claim 1, wherein the housing comprises a plurality of contoured input surfaces disposed in the shaped edge.

7. The apparatus of claim 6, wherein the plurality of contoured input surfaces comprise a first contoured input surface disposed substantially proximate to a first edge of the contoured edge and a second contoured input surface disposed substantially proximate to a second edge of the contoured edge.

8. The apparatus of claim 7, wherein the first edge is distal to the second edge.

9. The apparatus of claim 7, wherein the processor executes code to change a function associated with at least one of the first contoured input surface and the second contoured input surface based on a holding orientation of the apparatus.

10. An apparatus, comprising:
a housing;
a processor operatively coupled to a memory;
a display device displaying output from the processor;
the display, the processor and the memory being disposed in the housing; and
a stand element attached to the housing;
said housing substantially forming a quadrilateral and including a shaped edge at one end thereof;
said housing further comprising a contoured touch sensitive input surface substantially matching the shaped edge, wherein the contoured touch sensitive input surface is selected from the group consisting of an optical input surface and a capacitive input surface.

11. The apparatus of claim 10, wherein the shaped edge is substantially cylindrical, and further wherein said contoured touch sensitive input surface is substantially cylindrical.

12. The apparatus of claim 11, wherein the contoured touch sensitive input surface wraps substantially around the shaped edge.

13. The apparatus of claim 10, wherein the processor executes code to change a function associated with the contoured touch sensitive input surface according to an application currently being executed by the processor.

14. The apparatus of claim 10, wherein the housing comprises a plurality of contoured input surfaces disposed in the shaped edge.

15. The apparatus of claim 14, wherein the processor executes code to change a function associated with at least one of the plurality of contoured input surfaces based on an orientation of the stand element with respect to a main portion of the housing of the apparatus.

16. The apparatus of claim 14, wherein the processor executes code to change a function associated with at least one of the plurality of contoured input surfaces based on a holding orientation of the apparatus.

17. A method, comprising:
forming a substantially quadrilateral housing having disposed therein a processor operatively coupled to a memory;
providing a display device in said housing, said display device being operatively coupled to the processor;
said housing including a shaped edge at one end thereof; and
incorporating a contoured touch sensitive input surface with said shaped edge, said contoured touch sensitive input device substantially matching the shaped edge, wherein the contoured touch sensitive input surface is selected from the group consisting of an optical input surface and a capacitive input surface.

* * * * *